H. W. JAY.
MILLING ATTACHMENT FOR LATHES.
APPLICATION FILED FEB. 16, 1915.
1,217,949.
Patented Mar. 6, 1917.
2 SHEETS—SHEET 1.
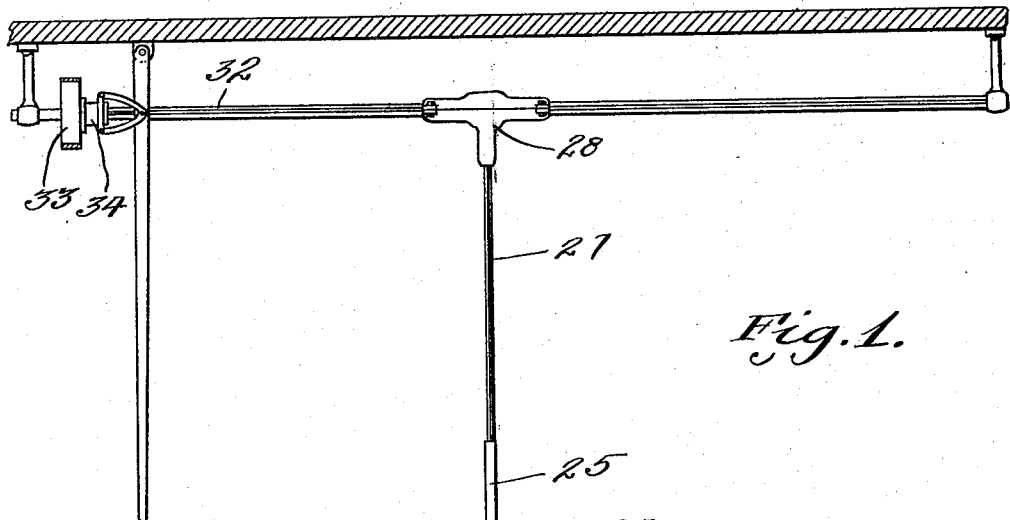
Fig. 1.
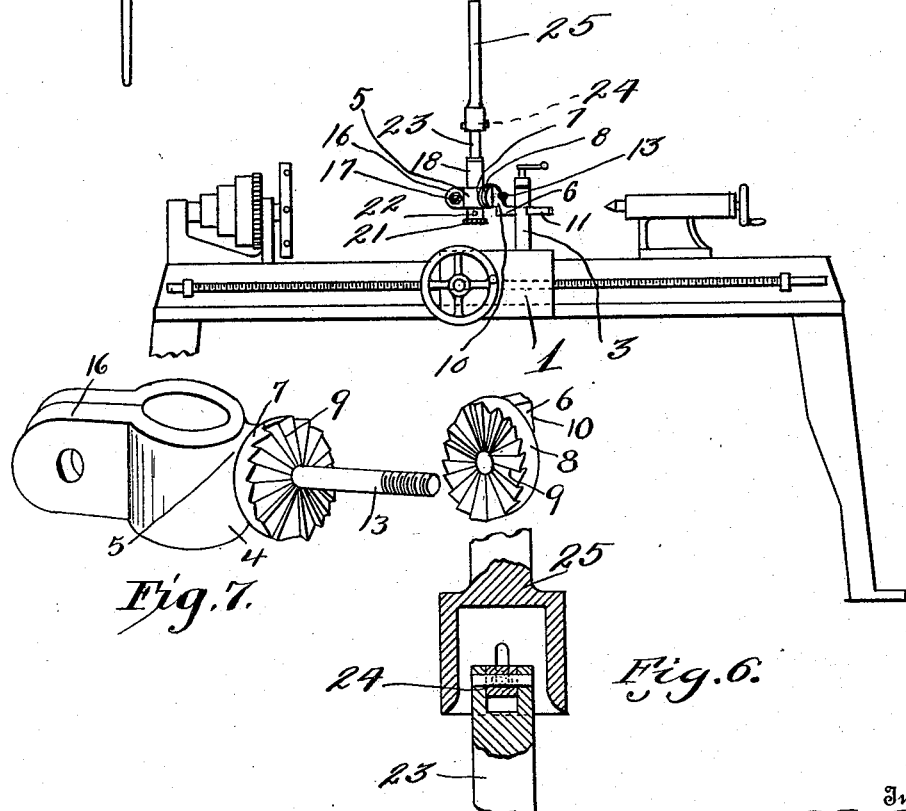
Fig. 7.
Fig. 6.
Witnesses
Philip Terrell
Frances G. Dowell
Inventor
H. W. Jay
By D. Swift & Co.
his Attorneys

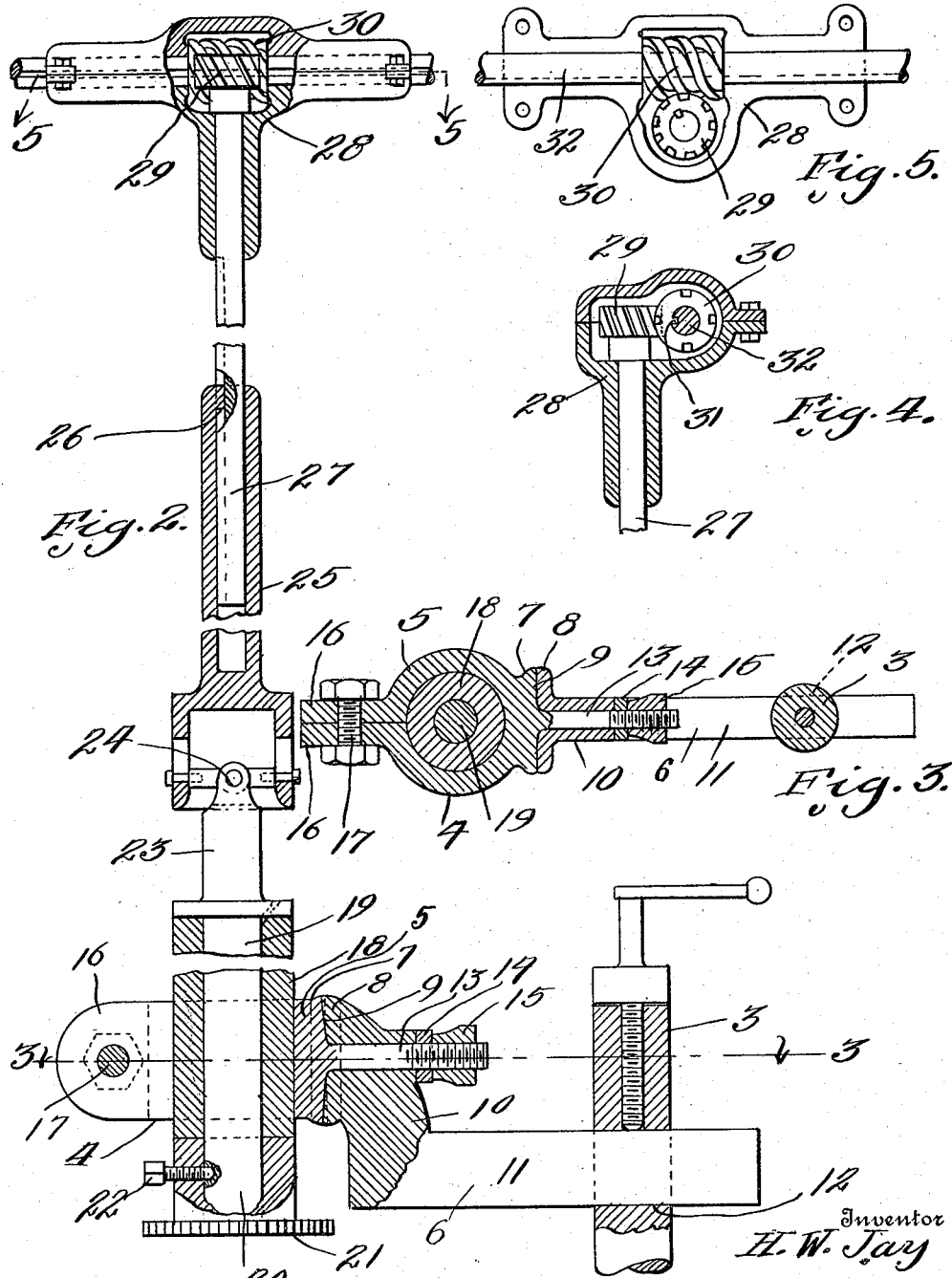

UNITED STATES PATENT OFFICE.

HERMAN W. JAY, OF AINSWORTH, NEBRASKA.

MILLING ATTACHMENT FOR LATHES.

1,217,949.
Specification of Letters Patent.
Patented Mar. 6, 1917.

Application filed February 16, 1915. Serial No. 8,464.

*To all whom it may concern:*

Be it known that I, HERMAN W. JAY, a citizen of the United States, residing at Ainsworth, in the county of Brown and State of Nebraska, have invented a new and useful Milling Attachment for Lathes; and I do hereby declare the following to be a full, clear, and exact description of the invention, such as will enable others skilled in the art to which it appertains to make and use the same.

This invention relates to a milling attachment for lathes, and as an object of the invention it is the aim to provide a holder for the milling cutter, which holder is provided with means to be received by the tool post of the lathe, so that the holder will move with the carriage of the lathe, said milling cutter having connections with an overhanging driven shaft, whereby the cutter is not only rotated, but the connections are allowed to move longitudinally on said driven shaft, so as to correspond with the movement of the carriage of the lathe.

In practical fields the details of construction may necessitate alterations, falling within the scope of what is claimed.

The invention comprises further features and combination of parts, as hereinafter set forth, shown in the drawings and claimed.

In the drawings:—

Figure 1 is a view showing the improved milling attachment as applied to a lathe, and showing its connections with an overhead driven shaft.

Fig. 2 is a vertical sectional view.

Fig. 3 is a sectional view on line 3—3 of Fig. 2.

Figs. 4 and 5 are detail views.

Fig. 6 is a sectional view of the universal connection 24 at right angles to that shown in Fig. 2.

Fig. 7 shows detail views of the two parts of the holder, illustrating the teeth of said plates 7 and 8.

Referring more especially to the drawings, 1 designates the usual form of carriage of a lathe, and is provided with a tool post 3. The milling attachment includes a holder 4, which consists of two parts 5 and 6, which are provided with interengaging circular plates 7 and 8, the engaging surfaces of which are provided with teeth 9. The plate 8 forms an integral part of the laterally extending portion 10 of the part 6 (the shank 11 of which is received in the socket 12 of the tool post of the carriage, so as to move with the carriage) whereas the plate 7 forms an integral part of the sleeve part 5. The sleeve part 5 is constructed with a laterally extending screw shank 13, which extends through the lateral portion 10, and is provided with a nut 14 and a lock nut 15, for holding the sleeve part 5 in adjusted positions relative to the lateral portion 10. In other words, by loosening the nuts, the positions of the sleeve parts may be changed, and the teeth of said plates 7 and 8 act to prevent movement of the sleeved part. The sleeve part 5 is split, as shown, and is formed with lateral ears 16, to receive the set bolt 17 so as to clamp the sleeve part firmly to the holding casing 18, in which the shaft 19 has a bearing. On the end 20 of the shaft 19 a milling tool 21 may be secured by a set bolt 22, while the end 23 of the shaft has a universal connection 24 with the tubular shaft 25, which in turn is splined or feathered at 26 to the shaft 27, the upper end of which has a bearing in the T-shaped casing 28. The upper end of the shaft 27 has mounted thereon a worm wheel 29, which meshes with the worm 30, which is splined or feathered, as shown at 31 to the horizontally disposed overhanging driving shaft 32, which is driven by means of the pulley 33 which has belt connections, for receiving power from any suitable source (not shown). This pulley 33 is loose upon the shaft 32, and by means of the suitable conventional clutch mechanism 34, the pulley is thrown in clutch with the shaft 32. As the shaft 32 is driven, the milling cutter 21 is operated, through the worm wheel and worm connection, and by means of the connections between the two part holder (which is carried by the tool post of the carriage of the lathe) and the overhanging driving shaft 32, said holder and said connections may move with the carriage of the lathe, and upon the shaft 32. By loosening the nuts 14 and 15 the part 5 of the holder may be adjusted so that the casing 18 will assume an angle relative to the part 6, so that the cutting edge of the milling tool may be held in a different position to that shown in the drawing, and when the casing 18 is so disposed, movement is still imparted to the milling tool, even though the shaft 19 extends on an angle, owing to the universal connection 24. Furthermore, by means of the splined or feathered connections between the tubular shaft and the shaft 27, the holder may be adjusted toward and from the shaft 32.

The invention having been set forth, what is claimed as new and useful is:—

In combination with a movable lathe carriage, a holder secured adjustably in the tool post of the carriage, said holder comprising two parts, one part being carried by the tool post and having at one end an upwardly extending portion provided with a toothed plate, the other part comprising a split sleeve having a toothed plate to interengage with the teeth of the first plate, the second plate having means extending through the upwardly extending portion and provided with elements to hold the two plates in adjusted positions relative to each other, a casing in the sleeve, means for clamping the split sleeve about the casing, a shaft revoluble in the casing and having a cutter at its lower end, and a driving mechanism having universal, vertical and transversely movable connections with the other end of the shaft.

In testimony whereof I have signed my name to this specification in the presence of two subscribing witnesses.

HERMAN W. JAY.

Witnesses:
P. W. MURPHY,
A. S. KIRKPATRICK.

Copies of this patent may be obtained for five cents each, by addressing the "Commissioner of Patents, Washington, D. C."